United States Patent Office 3,458,406
Patented July 29, 1969

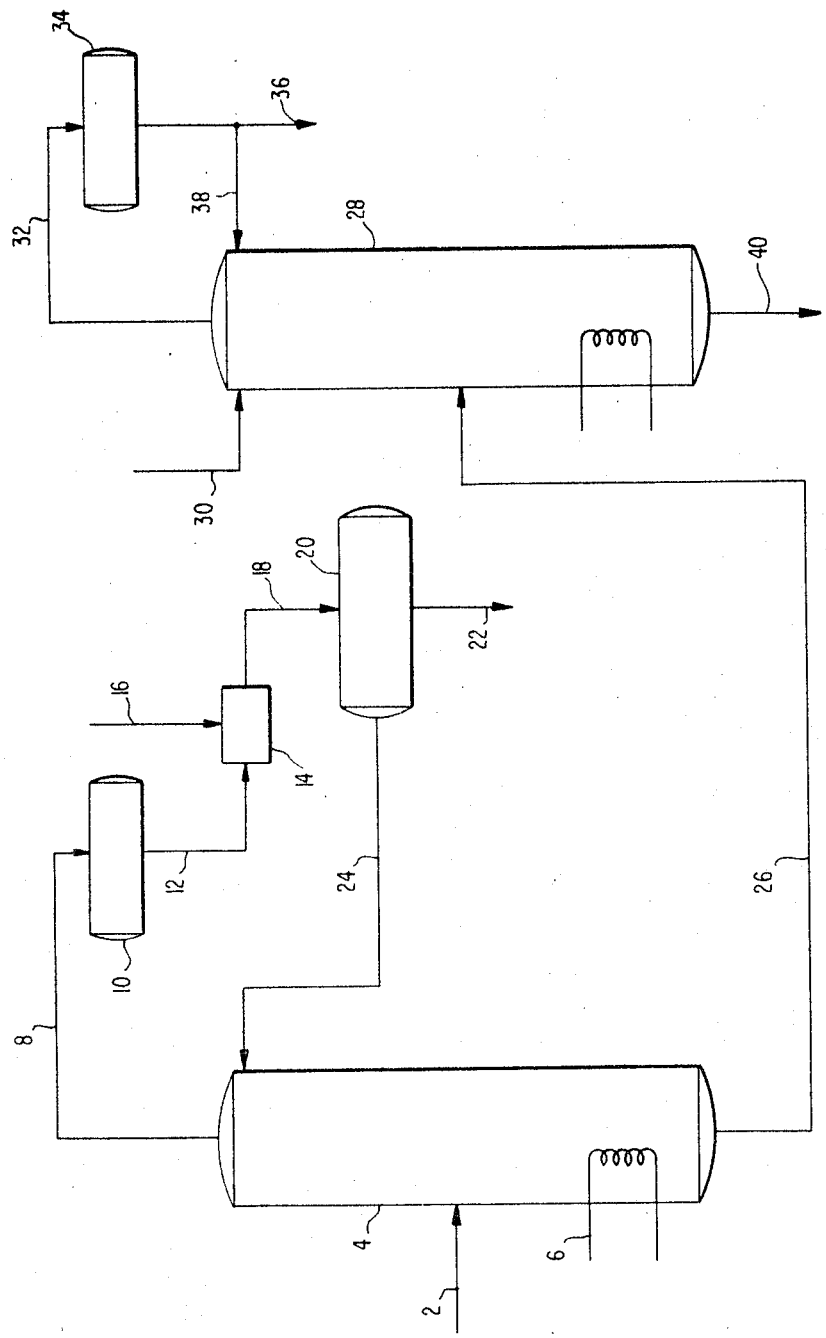

3,458,406
REMOVAL OF METHYL AND ETHYL ACETATE FROM VINYL ACETATE
Gene Jordan Fisher and Jerald Edson Dirks, Corpus Christi, Tex., assignors to Celanese Corporation, New York, N.Y., a corporation of Delaware
Filed May 26, 1966, Ser. No. 553,163
Int. Cl. B01d 3/40, 3/34
U.S. Cl. 203—44                                 8 Claims

ABSTRACT OF THE DISCLOSURE

Disclosed herein is a process for the purification of crude vinyl acetate containing methyl acetate and vinyl acetate. The process disclosed herein combines the use of distillation and water extraction to separate the methyl and ethyl acetate from the vinyl acetate. The process has particular application to the purification of vinyl acetate prepared by reacting ethylene with acetic acid in the presence of a reduction-oxidation catalyst.

---

The present invention relates to a process for the purification of crude vinyl acetate. More particularly, the invention relates to a process for the removal or separation of methyl acetate and ethyl acetate from vinyl acetate.

Heretofore, one of the primary methods for producing vinyl acetate was from acetylene. Recently, however, an ethylene-based process has been developed, which comprises reacting ethylene with acetic acid in the presence of a reduction-oxidiation catalyst system, commonly referred to as a Redox catalytic system. In the Redox system, an acid salt of a noble metal of Group VIII of the Periodic Table, for example, palladium chloride or palladium acetate, and a Redox couple, such as cupric chloride or cupric acetate, are used. The palladium acid salt is reduced to palladium metal during the primary reaction step of combining ethylene with acetate to form vinyl acetate. Palladium metal is then reoxidized to the acid salt by reaction with the Redox couple, such as cupric chloride, which is in turn reoxidized by reaction with oxygen. Such an ethylene-based vinyl acetate process is disclosed in U.S. patent application Ser. No. 389,477, filed Aug. 13, 1964, by Adolfo F. Aguilo, which is assigned to the Celanese Corporation of America.

The crude vinyl acetate which is produced by the above ethylene-based process contains small amounts of by-product organic compounds, particularly methyl and ethyl acetate. Commercial specification vinyl acetate, to be suitable for use in other processes such as a monomer or comonomer for polymerization, must be substantially free of all impurities, particularly methyl and ethyl acetate.

Unfortunately, many of the purification processes which are used to purify vinyl acetate produced from acetylene are not applicable to the ethylene-based process because of the different types and amounts of by-product impurities which are present therein, specifically methyl and ethyl acetate.

Accordingly, the primary object of the present invention is to provide a process for purifying crude vinyl acetate. Another object is to provide a process for removing or separating methyl and ethyl acetate from vinyl acetate, and particularly from crude vinyl acetate obtained via an ethylene-based process.

In accordance with the present invention, a process is provided for the purification of crude vinyl acetate containing methyl acetate and ethyl acetate. The crude vinyl acetate is introduced into a distillation zone whereby an overhead vapor stream comprising vinyl acetate and methyl acetate is removed, the proportion of methyl acetate in the overhead stream being greater than in the crude feed stream to the distillation zone. The overhead stream is contacted with water to extract at least a portion of the methyl acetate therefrom whereby a water-immiscible phase comprising vinyl acetate and an aqueous phase containing the extracted methyl acetate are formed. The water-immiscible phase is separated from the residual aqueous phase and is then introduced into the distillation zone as reflux. A bottoms product comprising vinyl acetate, ethyl acetate, and a lower proportion of methyl acetate than in the crude feed to the distillation zone is removed from the distillation zone. The bottoms product stream is introduced into an extractive distillation zone employing water as the extracting agent. An overhead product comprising vinyl acetate and having a lower proportion of methyl and ethyl acetate than in the crude feed to the distillation zone is recovered from the extractive distillation zone.

In a preferred embodiment of the present invention, crude vinyl acetate obtained from an ethylene-based process and containing up to 2.5 weight percent methyl acetate, based on vinyl acetate, and in the range of from about 0.1 to 0.5 weight percent ethyl acetate, based on vinyl acetate, is purified to remove substantially all of the methyl and ethyl acetate therefrom.

METHYL ACETATE REMOVAL

Methyl acetate is an impurity which is produced in the ethylene-based vinyl acetate process. Methyl acetate is a lower boiling material than vinyl acetate, and under normal conditions a certain amount of separation of the materials can be obtained by conventional distillation. However, crude vinyl acetate produced via the ethylene-based process contains a very small amount of by-product methyl acetate, normally up to about 2.5 weight percent, based on the weight of the vinyl acetate. Further, this relatively small amount of methyl acetate must be substantially completely removed from the vinyl acetate to produce a saleable commercial product. Specification vinyl acetate used as a monomer or comonomer will normally contain less than 50 parts per million (p.p.m.) of methyl acetate, and preferably less than 20 p.p.m. Conventional distillation can not be used, economically, to achieve such a separation primarily because of the high concentration of methyl acetate that would be required in the overhead of the distillation column to prevent excessive losses of vinyl acetate, which would in turn require many distillation trays. It has been found, however, that such a separation can be achieved via a combination of distillation, and extraction with water.

The amount of methyl acetate present in the vinyl acetate feed to the methyl acetate distillation zone is not critical, but will normally be in the range of from about 0.1 to 2.5 weight percent, based on the vinyl acetate. Preferably, the vinyl acetate feed stream is heated, prior to being introduced into the zone, to a temperature in the range of from about 40 to 80° C., and more preferably in the range of from about 50 to 70° C.

An overhead vapor stream is removed from the methyl acetate distillation zone at a temperature, typically in the range of from about 50 to 90° C. The distillation zone may be maintained at any convenient pressure, for example, 1 to 10 atmospheres and preferably atmospheric pressure. In order to reduce the amount of methyl acetate in the product vinyl acetate to below about 50 p.p.m., it has been found that the overhead stream withdrawn from the distillation zone must contain in the range of from about 15 to 75 weight percent methyl acetate, and preferably 35 to 60 weight percent methyl acetate.

The amount of water contacted with the overhead stream to extract the methyl acetate therefrom is normally in the range of from about 0.1 to 1.0 mols of water per mol of methyl acetate contained in the overhead stream, and preferably in the range of from about 0.3 to 0.8 mols of water per mol of methyl acetate. Higher amounts of water may be used if so desired. Any convenient method may be employed for contacting the water and the overhead stream, however, it is desirable to contact the water and overhead stream after the overhead stream has been condensed in order to minimize hydrolysis of the vinyl acetate. Hydrolysis of the vinyl acetate causes the formation of acetic acid and acetaldehyde. Normally, the contacting is conducted at about room temperature (15 to 30° C.), although higher or lower temperatures may be used if so desired.

The contact time between the water and vinyl acetate should be as short as possible to minimize hydrolysis. Usually, a period of time up to about 10 minutes will be sufficient to mix the water and overhead stream, and to separate the vinyl acetate phase from the aqueous phase.

Other light end materials which may be presented in the crude vinyl acetate feed to the distillation zone, such as vinylformate, formaldehyde, and acetaldehyde are also withdrawn from the distillation zone in the overhead vapor stream and extracted therefrom with the methyl acetate.

The water-immiscible phase of vinyl acetate which is separately recovered from the residual aqueous phase will normally contain from about 5 to 20 weight percent less methyl acetate than contained in the overhead stream. The amount of vinyl acetate lost by hydrolysis and the amount of vinyl acetate which is carried over into the aqueous phase is normally less than about 2 weight percent of the feed vinyl acetate introduced into the distillation zone.

The water-immiscible vinyl acetate phase after being separated from the residual aqueous phase is reintroduced into the methyl acetate distillation zone as reflux. In order to obtain the desired vinyl acetate purification, the crude vinyl acetate feed to the methyl acetate distillation zone, and the reflux vinyl acetate phase are controlled such that a reflux ratio in the range of from about 2:1 to 8:1 and preferably of from about 3:1 to about 6:1 is maintained therein.

A purified vinyl acetate stream is removed as a bottoms product from the distillation zone, typically at a temperature in the range of from about 50 to 90° C. The amount of methyl acetate contained in this bottoms product will normally be below about 50 p.p.m., and preferably below about 20 p.p.m., based on the vinyl acetate.

ETHYL ACETATE REMOVAL

Ethyl acetate is also a by-product impurity resulting from the ethylene-based vinyl acetate process. Due to the boiling point of ethyl acetate (77° C.) it is quite difficult to separate it from vinyl acetate (boiling point 73° C.). It has been found, however, that such a separation may be achieved by the use of extractive distillation, with water as the extractant, whereby the purified vinyl acetate is removed as an overhead product, and the ethyl acetate is recovered from the extractive distillation zone as an aqueous bottoms product.

While any feed mixture of vinyl acetate and ethyl acetate may be used in the present invention to at least decrease the amount of ethyl acetate in the product vinyl acetate, the crude vinyl acetate feed obtained from an ethylene-based process contains below 2 weight percent ethyl acetate and usually from about 0.1 to 0.5 weight percent, based on vinyl acetate.

The vinyl acetate feed stream to the extractive distillation zone is normally preheated to a temperature in the range of from about 50 to 90° C., and preferably in the range of from about 60 to 85° C. prior to being introduced therein. Water is fed to the ethyl acetate extractive distillation zone above the point at which the vinyl acetate feed containing the ethyl acetate is introduced. A water to vinyl acetate feed ratio (weight ratio) in the range of from about 0.1:1 to 1:1 will normally be sufficient to reduce the ethyl acetate content of a crude vinyl acetate feed obtained from an ethylene-based process to below about 500 p.p.m., and preferably below about 200 p.p.m., based on vinyl acetate. Higher or lower amounts of water may be used if so desired depending on the exact concentration of ethyl acetate in the feed stream.

Reflux ratios in the range of from about 3:1 to 10:1 are usually employed in the extractive distillation zone to obtain the desired purifictaion. Purified vinyl acetate is removed as an overhead product from the extractive distillation zone, while the ethyl acetate is removed as an aqueous bottoms product. The temperature at the top of the extractive distillation zone is typically in the range of from about 60 to 100° C., while the temperature at the bottom of the zone is typically in the range of from about 60 to 110° C. Any convenient pressure may be used in the extractive distillation zone, for example, 1 to 10 atmospheres, and preferably atmospheric pressure.

For a better and more complete understanding of the present invention, its objects, and advantages, reference should be had to the following description and to the accompanying drawing, which is a schematic flow diagram illustrating a process for removing methyl acetate and ethyl acetate from crude vinyl acetate produced by an ethylene-based process.

Crude vinyl acetate produced via an ethylene-based process and containing up to 2.5 weight percent of methyl acetate, based on vinyl acetate, e.g., 1.0 weight percent, and in the range of from about 0.1 to 0.5 weight percent of ethyl acetate, based on vinyl acetate, e.g., 0.2 weight percent, is introduced via a conduit 2 into a methyl acetate distillation zone 4. The distillation zone 4 may be any of the conventional type zones for carrying out a distillation process such as a tower provided with packing, bubble cap trays, or perforated trays such as sieve trays. The crude vinyl acetate feed stream is preheated to a temperature in the range of from about 50 to 70° C., e.g., 60° C., prior to being introduced therein.

The distillation effect in the zone 4 may be maintained by means of any conventional reboiling of the bottoms, which is schematically represented in the drawing by heater coil 6, which serves as a heat source for the vapor generation. As a result of the distillation, an overhead vapor stream comprising 35 to 60 weight percent of methyl acetate, e.g., 40 weight percent, up to about 5 percent water and organic by-products such as vinyl formate, formaldehyde, and acetaldehyde, and the remainder vinyl acetate is withdrawn via a conduit 8. The overhead vapor stream which is withdrawn at a temperature in the range of from about 50 to 90° C., e.g., 80° C., and atmospheric pressure is then introduced into any conventional type condensing zone 10. The condensed overhead vapor stream is withdrawn from the condensor 10 via a conduit 12 and mixed in a mixing zone 14 with water introduced via a conduit 16.

In order to prevent any polymerization of the condensed vinyl acetate, a polymerization inhibitor such as hydroquinone, phenothiazine, and the like may be introduced with the water via the conduit 16. The amount of water introduced is in the range of from about 0.3 to 0.8 mol of water per mol of methyl acetate in the overhead stream, e.g., 0.5 mol of water. Upon contact with the overhead stream the water extracts at least a portion of the methyl acetate therefrom.

While the source of the water supply introduced via the conduit 16 is not critical, it is desirable that at least a portion, and preferably substantially all of the water be process water, that is, water obtained as a by-product in the ethylene-based vinyl acetate process. The water of reaction formed in the ethylene-based process is removed in a separate unit not shown on the drawing and then introduced via the conduit 16 into the mixing zone 14.

Any conventional type mixing zone may be employed in the present invention. Preferably, however, an in-line mixing zone such as a jet mixer is utilized to contact the condensed vapor stream with the water. In this manner, the contact time between the water and the vinyl acetate in the mixing zone 14 is minimized. The effluent from the in-line mixer 14 is conveyed via a conduit 18 to any conventional type liquid settling zone such as a decanting zone 20, wherein a water-immiscible vinyl acetate phase and an aqueous phase containing methyl acetate and other light ends such as vinyl formate, formaldehyde, acetaldehyde, and the like are formed.

The residual aqueous phase is withdrawn from the decanting zone 20 via a conduit 22, and is normally discarded. The water-immiscible vinyl acetate phase is separately withdrawn from the decanting zone 20 via a conduit 24, and is reintroduced as reflux into the distillation zone 4. The vinyl acetate phase contains about 5 to 20 weight percent less methyl acetate than the overhead stream, e.g., 12 weight percent. As previously mentioned, the feed of crude vinyl acetate via the conduit 2 and the reflux via the conduit 24 are controlled such that a reflux ratio in the range of from about 3:1 to 6:1, e.g., 4:1, will be obtained in the distillation zone 4.

A vinyl acetate bottoms product containing less than about 20 p.p.m. of methyl acetate, e.g., 10 p.p.m., and from about 0.1 to 0.5 weight percent ethyl acetate is withdrawn from the distillation zone 4 via a conduit 26, and introduced, preferably without any intentional cooling, into an extractive distillation zone 28. The temperature of the feed is normally in the range of from about 60 to 85° C., e.g., 75° C.

Any conventional type extractive distillation zone may be used, e.g., a tower employing bubble cap trays, perforated trays such as sieve trays, or packing to ensure satisfactory vapor-liquid contact. Extractant water is introduced into the zone 28 via a conduit 30 at a weight ratio of water to organic feed in the range of from about 0.1:1 to 1:1, e.g., 0.2:1.

A purified vinyl acetate stream containing less than about 20 p.p.m. methyl acetate and 200 p.p.m. ethyl acetate, based on vinyl acetate, is removed as an overhead product from the zone 28 via a conduit 32. The overhead vapor stream may be condensed in any conventional type condensing zone 34 to recover the purified vinyl acetate product via a conduit 36, at least a portion of which may be returned as reflux to the extractive distillation zone 28 via a conduit 38. An aqueous bottoms stream containing the extracted ethyl acetate is withdrawn from the zone 28 via a conduit 40.

The present invention is additionally illustrated by the following examples.

Example I

A mixture comprising 98.1 weight percent vinyl acetate, 0.67 weight percent methyl acetate, and 1.23 weight percent of water and other organic materials is introduced at the 40th tray from the bottom of a 60 tray (sieve trays) distillation column. An overhead vapor stream is withdrawn from the distillation column at a temperature of about 80° C., and is introduced into a condenser wherein it is mixed with an aqueous solution containing 0.2 weight percent hydroquinone, the aqueous solution being preheated to about 73° C.

The water-condensate mixture is withdrawn from the condenser and introduced into a decanter to separate a water-immiscible vinyl acetate phase from an aqueous phase. The vinyl acetate phase is separately withdrawn from the decanter and reintroduced into the distillation zone, the feed rate being controlled such that a reflux ratio of about 3.6:1 is obtained in the zone.

A bottoms product at a temperature of about 75° C. is withdrawn from the distillation zone and contains 99.9 weight percent vinyl acetate, less than 10 p.p.m., methyl acetate, and the remainder water and other organic materials.

Example II

The above Example I is repeated except that the overhead stream is first condensed and the condensate contacted with the aqueous solution of hydroquinone, the contacting occurring at about 25° C. In this manner, the amount of vinyl acetate that is hydrolyzed is decreased.

Example III

A mixture comprising 99.8 weight percent vinyl acetate and 0.2 weight percent ethyl acetate is introduced at the 55th tray from the bottom of a 100 tray (sieve trays) extractive distillation column operated at atmospheric pressure.

Water is fed to the column at the 99th tray, at a weight ratio of water to crude organic feed of 0.19:1. A reflux ratio of about 3:1 is maintained in the column.

An overhead stream, at a temperature of about 66° C., of purified vinyl acetate containing less than 500 p.p.m. ethyl acetate based on vinyl acetate, is recovered from the zone.

An anhydrous distillation zone having about 140 trays would be required to achieve a similar purification.

The principle, preferred embodiments, and modes of operation of the present invention have been described in the foregoing specification. However, it should be understood that the invention which is intended to be protected herein, may be practiced otherwise than as described without departing from the scope of the appended claims.

We claim:

1. A process for the purification of crude vinyl acetate obtained by reacting ethylene with acetic acid in the presence of a reduction-oxidation catalyst and containing relatively small amounts of methyl acetate and ethyl acetate, which comprises (a) introducing said crude vinyl acetate into a distillation zone, (b) removing an overhead stream from said distillation zone comprising vinyl acetate and methyl acetate, the proportion of methyl acetate in said overhead stream being greater than in the crude feed to said distillation zone and in the range of from 15 to 75 weight percent of methyl acetate, (c) contacting the overhead stream with water to extract at least a portion of the methyl acetate therefrom, whereby a water-immiscible vinyl acetate phase and an aqueous phase containing extracted methyl acetate are formed, (d) separating the water-immiscible vinyl acetate phase from the residual aqueous phase, (e) reintroducing said water-immiscible vinyl acetate phase into said distillation zone as reflux, (f) withdrawing as a bottoms product from said distillation zone a stream comprising vinyl acetate, ethyl acetate, and methyl acetate, the proportion of methyl acetate in said bottoms product being lower than in the crude feed to said distillation zone, (g) introducing said bottoms product into an extractive distillation zone employing water as an extractant, and (h) withdrawing as an overhead product from said zone a purified vinyl acetate stream containing less than 20 parts per million of methyl acetate and less than 500 parts per million of ethyl acetate, based on vinyl acetate.

2. The process of claim 1 wherein the crude vinyl acetate feed to the distillation zone of step (a) contains in the range of from about 0.1 to 2.5 weight percent methyl acetate, based on vinyl acetate, and in the range of from about 0.1 to 0.5 weight percent ethyl acetate, based on vinyl acetate.

3. The process of claim 1 wherein the overhead stream withdrawn from the distillation zone is condensed prior to being contacted with water.

4. The process of claim 1 wherein the crude vinyl acetate feed to the distillation zone of step (a), and the water-immiscible vinyl acetate phase of step (e) are controlled such that a reflux ratio in the range of from about 2:1 to 8:1 is maintained in the distillation zone.

5. A process for the purification of crude vinyl acetate obtained by reacting ethylene with acetic acid in the presence of a reduction-oxidation catalyst and containing up to 2.5 weight percent methyl acetate, based on vinyl acetate, and in the range of from 0.1 to 0.5 weight percent ethyl acetate, based on vinyl acetate, which comprises (a) introducing said crude vinyl acetate into a distillation zone, (b) recovering an overhead vapor stream comprising vinyl acetate and in the range of from about 35 to 60 weight percent methyl acetate, (c) condensing said overhead vapor stream, (d) contacting said condensed stream with water at a mol ratio in the range of from about 0.1 to 1.0 mols of water per mol of methyl acetate to extract methyl acetate therefrom, whereby a water-immiscible vinyl acetate phase containing about 5 to 20 weight percent less methyl acetate than in the overhead stream and an aqueous phase containing methyl acetate are formed, (e) separately recovering the water-immiscible vinyl acetate phase, (f) reintroducing the water-immiscible vinyl acetate phase into said distillation zone as reflux so as to maintain a reflux ratio therein in the range of about 3:1 to 6:1, (g) withdrawing as a bottoms product from said zone a stream comprising vinyl acetate, less than about 20 parts per million methyl acetate and in the range of from about 0.1 to 0.5 ethyl acetate, based on vinyl acetate, (h) introducing said bottoms stream into an extractive distillation zone, (i) introducing water as an extractant into said extractive distillation zone above the point of introduction of said bottoms stream, and (j) recovering as an overhead product from said zone a purified stream of vinyl acetate containing less than about 20 parts per million methyl acetate and less than about 500 parts per million ethyl acetate, based on vinyl acetate.

6. The process of claim 5 wherein the purified vinyl acetate stream withdrawn from the extractive distillation zone contains less than about 200 parts per million ethyl acetate.

7. The process of claim 5 wherein a reflux ratio in the range of about 3:1 to 10:1 is maintained in the extractive distillation zone.

8. A process for the separation of ethyl acetate from a crude vinyl acetate stream prepared from ethylene and containing up to about 2 weight percent of ethyl acetate, which comprises subjecting said stream to an extractive distillation employing water as the extractant, taking vinyl acetate off as the overhead product containing less than about 500 parts per million of ethyl acetate, and removing an aqueous bottoms stream containing the extracted ethyl acetate, the weight ratio of extractant water to crude vinyl acetate stream being at least from about 0.1:1 to 1:1.

References Cited

UNITED STATES PATENTS

| 2,341,433 | 2/1944 | Fisher | 203—44 |
| 3,221,045 | 11/1965 | McKeon et al. | 260—497 |
| 3,277,158 | 10/1966 | Schaeffer | 260—497 |
| 3,346,624 | 10/1967 | Schaeffer et al. | 260—497 |
| 3,253,020 | 5/1966 | Schaeffer | 260—497 |
| 3,260,739 | 7/1966 | Schaeffer | 260—497 |
| 3,290,362 | 12/1966 | Schaeffer | 260—497 |
| 2,470,222 | 5/1949 | Patterson | 203—43 |

FOREIGN PATENTS

| 1,358,052 | 3/1964 | France. |

NORMAN YUDKOFF, Primary Examiner

F. E. DRUMMOND, Assistant Examiner

U.S. Cl. X.R.

203—85; 260—497